E. B. HESS.
TYPE WRITING MACHINE.
APPLICATION FILED AUG. 8, 1907.

946,776.

Patented Jan. 18, 1910.

WITNESSES:
L. F. Browning
E. O. Mitchell

INVENTOR
Edward B. Hess
BY
Edward C. Davidson
ATTORNEY derdeen
UNITED STATES PATENT OFFICE.

EDWARD B. HESS, OF NEW YORK, N. Y., ASSIGNOR TO ROYAL TYPEWRITER COMPANY, OF HOBOKEN, NEW JERSEY, A CORPORATION OF NEW JERSEY.

TYPE-WRITING MACHINE.

946,776.

Specification of Letters Patent. Patented Jan. 18, 1910.

Application filed August 8, 1907. Serial No. 387,587.

*To all whom it may concern:*

Be it known that I, EDWARD B. HESS, a citizen of the United States of America, residing in the borough of Brooklyn, city and State of New York, have invented certain Improvements in Type-Writing Machines, of which the following is a specification.

This invention relates to escapement devices of a typewriting machine. Its object is to facilitate the feed, and therefore afford quickness of feed of the carriage, and to reduce the load upon the finger pieces of the type bar.

Figure 1:
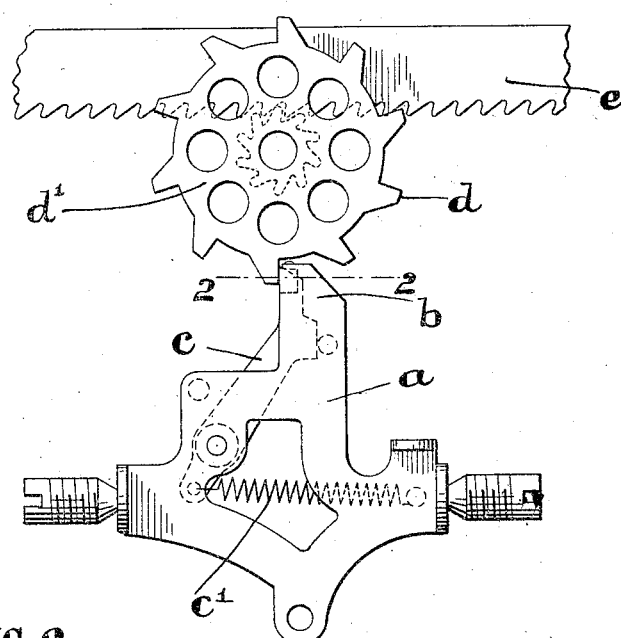
Figure 2:
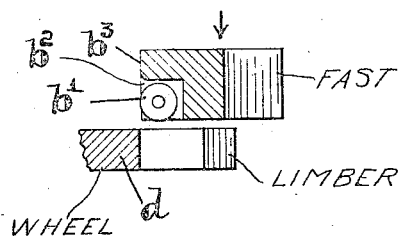
Figure 3:
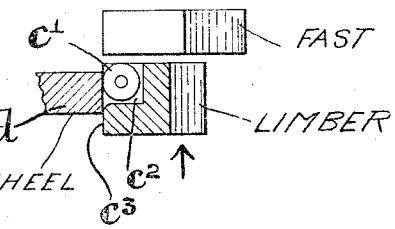
Figure 4:
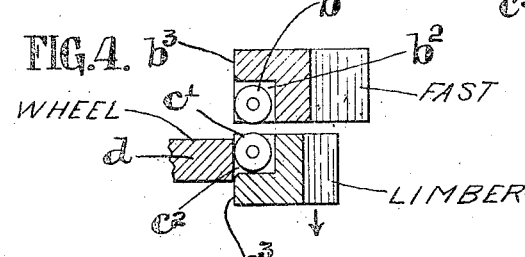

In the accompanying drawings: Figure 1 is a front elevation: Fig. 2, a section on the line 2, 2, of Fig. 1: Fig. 3, a like view showing a slight modification: Fig. 4, a view, similar to Fig. 3, showing a modification.

The escapement frame $a$ is mounted to rock as usual and carries or is formed with the usual fast dog $b$ and has pivoted upon it a loose or limber dog $c$ to which is applied a coiled spring $c'$. The frame is to be rocked in the ordinary way from the universal bar. The dogs coöperate in the usual manner with the teeth $d$ of the escape wheel $d'$ driven by the rack $e$. The fast or the loose dog, or both of them, is provided with a roller. That of the fast dog is marked $b'$ and that of the limber dog is marked $c'$. These rollers are mounted to turn in recesses $b^2$, $c^2$ formed in the dogs at one corner thereof. Their axes are transverse to the axis of the escape wheel and their function is to facilitate the engagement of the dogs with, or disengagement from, the escape wheel and to thereby decrease the load on the finger pieces of the type bars and to facilitate travel of the carriage. Thus, when the escapement frame is rocked to cause the fast dog to engage a tooth of the escape wheel, the roller $b'$ will first contact with the working surface of the teeth and revolve during the movement of the dog until the rigid face $b^3$ of the dog engages the tooth. This will appear from Fig. 2 from which it will be understood that the escape frame will move to carry the dog in the direction indicated by the arrow. In like manner, the roller will facilitate disengagement from the dog when the latter is moved in reverse direction.

Fig. 3 shows the rigid surface $c^3$ of the loose dog engaged with a tooth of the escape wheel to effect which engagement it has been moved in a direction indicated by the arrow and during that movement the roller $c'$ has facilitated the travel of the dog. In like manner, the roller would facilitate disengagement of the dog when moved in reverse direction.

In Fig. 4 both dogs are provided with such roller and with rigid surfaces $b^3$, $c^3$ on which the teeth of the escape wheel are to finally engage.

I have shown a rocking escapement frame as that is the style of frame ordinarily employed but the invention is also applicable to a sliding or reciprocating frame.

It will be obvious to those skilled in the art that the feed of the carriage may be effected during depression of the finger pieces or while they are returning to normal elevated position.

I claim:

1. An escapement mechanism for a typewriting machine comprising an escape wheel, an escapement frame movable relatively to the wheel and carrying fast and limber dogs each having a rigid surface to engage the teeth of the escape wheel and one of the dogs having a roller that is first to engage and last to disengage the teeth of the wheel.

2. An escapement mechanism for a typewriting machine comprising an escape wheel, an escapement frame movable relatively to the wheel and carrying fast and limber dogs each having a rigid surface to engage the teeth of the escape wheel and one of the dogs having a roller that is first to engage and last to disengage the teeth of the wheel, the axis of said roller being transverse to the axis of the escape wheel.

3. An escapement mechanism for a typewriting machine comprising an escape wheel, an escapement frame having fast and limber dogs movable relatively to the frame both said dogs having rigid surfaces to engage the teeth of the escape wheel and also rollers for facilitating engagement and disengagement of the dogs with the teeth.

4. An escapement mechanism for a typewriting machine comprising an escape wheel, an escapement frame having fast and limber dogs movable relatively to the frame both said dogs having rigid surfaces to engage the teeth of the escape wheel and also rollers for facilitating engagement and disengagement of the dogs with the teeth, the axis of said rollers being transverse to the axis of the escape wheel.

In testimony whereof, I have hereunto subscribed my name.

EDWARD B. HESS.

Witnesses:
 LILLIE F. BROWNING,
 RICHARD B. CAVANAGH.